United States Patent [19]
Gatliff

[11] Patent Number: 5,829,191
[45] Date of Patent: Nov. 3, 1998

[54] METHOD OF GROWING AND HARVESTING VEGETATION FOR USE IN REMEDIATING CONTAMINATED SOIL AND/OR GROUNDWATER

[76] Inventor: Edward G. Gatliff, 7355 Dixon Dr., Hamilton, Ohio 45011

[21] Appl. No.: 771,954

[22] Filed: Dec. 23, 1996

[51] Int. Cl.$^6$ .............................. A01B 79/00; A01C 1/00; A01G 9/02; A01G 23/04; A01G 17/00; A47G 7/02; A47G 33/12; C21B 9/00; C22B 9/00; E04B 1/00; E04G 21/00; E04G 23/00

[52] U.S. Cl. ................. 47/58; 47/25; 47/42; 47/40.5; 47/76; 47/83; 75/710; 52/745.14

[58] Field of Search ................... 47/58, 83, 40.5, 47/42, 25, DIG. 3; 75/710; 52/745.14, 741.3, 578, 102, 71, 741.11

[56] References Cited

U.S. PATENT DOCUMENTS

| | | | |
|---|---|---|---|
| 4,310,990 | 1/1982 | Payne | 47/59 |
| 5,442,891 | 8/1995 | Albrecht | 52/745.14 |
| 5,476,142 | 12/1995 | Kajita | 166/294 |

OTHER PUBLICATIONS

Schnoor et al. ; Phytoremediation of Organic and Nutrient Contaminants; Environmental Science & Technology; vol. 29, No. 7, 1995, 318–323, 1995.

Kirkman; Basic Gardening Illustrated; 1975, 1–128 (Only pp. 20, 48–53, & 122), 1975.

*Primary Examiner*—Douglas W. Robinson
*Assistant Examiner*—Kent L. Bell
*Attorney, Agent, or Firm*—Lerner, David, Littenberg, Krumholz & Mentlik

[57] ABSTRACT

A method of growing trees for transplantation develops a long and narrow root system for ready rooting activity when transplanted at a remediation site. The trees can be grown in a lined hole with an optional basin, or cap, or otherwise lined at the bottom. The liner can be removed with the root system and associated soils for ease of transportation, and for use in continuing to encourage a downward vertical growth of the root system after transplantation. The trees can also be grown out of the ground in vertical or horizontal tubes which receive, under controlled conditions, water and nutrients. The medium in which tree can be grown out of the ground includes hydroponic media and soil.

24 Claims, 4 Drawing Sheets

METHOD OF GROWING AND HARVESTING VEGETATION FOR USE IN REMEDIATING CONTAMINATED SOIL AND/OR GROUNDWATER

BACKGROUND OF THE INVENTION

The present invention is directed to phytoremediation, and more specifically to facilitating the directed growth of tree root systems, whereby such trees can be harvested and transplanted for remediating contaminated soil and/or groundwater.

The preservation and protection of the environment are among the most paramount social and economic issues affecting our society today. In instances where soil and/or groundwater have been contaminated by industry, the assessment of the contamination must be swiftly implemented, and the remediation of the assessed contamination must be effective and inexpensive as possible.

During an assessment phase, the contaminant in the soil or groundwater is identified. Typical contaminants of soil and groundwater include nitrates, heavy metals, and other inorganic or organic compositions. The extent of contamination by any of these or other contaminants is then ascertained. At that point, remediation approaches must be investigated, and an appropriate methodology or methodologies is selected. Typical remediation methods include the removal and disposal of the contaminated soil; sparging (i.e., forcing oxygen into water and/or soil to enhance microbial activity); and pump and treat techniques whereby contaminated groundwater is pumped and treated out of the ground.

In addition to the above techniques, bioremediation techniques, i.e., techniques which take advantage of natural biological processes, are becoming more popular as the primary or secondary methodology for the clean up of contaminants. Bioremediation techniques include the use of microorganisms to metabolize or otherwise chemically transform hazardous or toxic substances; but also include the use of plants to absorb and metabolize or otherwise degrade contaminants through the natural processes which take place during the life of various plants. The use of plants for environmental remediation is referred to as phytoremediation and may also be referred to as vegetative remediation. Phytoremediation is emerging as a preferred technique for remediating many contaminated sites, because it is a cost effective measure, and it is often less invasive to the contaminated real estate than other measures.

The concept underlying phytoremediation is to allow vegetation to extract contaminants from the soil and/or groundwater, and/or to introduce via the root system microbes, nutrients, substrates, water and oxygen to enhance other biological processes, thereby "cleansing" the soil and/or groundwater. The vegetation might then dissipate the contaminant in a non-harmful manner, thereby cleansing itself, or, depending upon the vegetation and the contaminant, the vegetation might need to be removed and destroyed or otherwise disposed of. Different plant species will effect the cleansing in different ways. For instance, some species will extract the contaminants and assimilate the same within its root, branch and leaf systems, while other species will extract the contaminant and chemically decompose the same through the natural biochemical processes inherent in that species.

Phytoremediation has grown beyond simply planting vegetation in contaminated areas. Overall strategies, including a determination of what plant species to employ, are developed and implemented based on the contamination site, its location, the types of contaminants to be cleaned up, etc. One technique which has been employed when actually planting the vegetation has been to alternately run an auger into the ground and place a hard pipe, for instance PVC piping, into the hole in the ground. The hard pipe was inserted to the point where the unsaturated layer (the vadose zone) meets the saturated layer (the capillary fringe). In employing this technique, the holes were about thirty-six (36) inches in diameter and as deep as twelve (12) feet. The hard pipes used in this technique have been from four (4) to twelve (12) feet long. The object of the hard casing was to encourage root growth in the vertical direction and prevent the more natural horizontal root growth near the surface since there may be less or no contamination at the near surface level. However, the use of hard casings is expensive at remediation sites which include many trees. Also, perhaps more importantly, surface water migrates vertically along the hard casing to deeper levels. This affects the root growth in that the deeper root system would be less apt to develop to seek water and nutrients at a deeper level in order to meet its needs for growth, and instead would feed on the migrating surface water. In addition, the migration of large volumes of surface water can preferentially fill the void space in the hole created by the auger which in certain cases can lead to the drowning of the tree roots. This could kill or seriously harm the tree, rendering the remedial process ineffective. The above, in turn, would adversely affect the ability and efficiency of the root system to extract contaminated soil and/or groundwater, and lessen the remedial effect of the vegetation.

The present invention addresses techniques for growing trees to be harvested and transplanted for use in remediating contaminated soil and/or groundwater. The techniques yield more viable vegetation which permit faster root activity upon transplantation, and thus more effective remediation.

SUMMARY OF THE INVENTION

The present invention relates specifically to methods for growing trees to be harvested for use in remediating contaminated soil and/or groundwater. In one aspect of the present invention, trees are grown in a hole in the earth which has been structured to influence the downward growth of the root system of the tree, the tree is harvested with its resulting substantially long and narrow root system, transported to a contaminated site and replanted to facilitate remediation of contaminated soil and/or groundwater at the contaminated site.

In another aspect of the present invention, the root system is grown in a casing which is not within the earth, but still in such a way that the root system of the tree is influenced to grow substantially long. In this aspect of the present invention, the tree and its root system are also harvested, transported and transplanted for remediation.

In connection with the present invention, the root growth of the tree can be controlled to some extent.

It is an object of the present invention to provide a method by which trees for use in remediating contaminated soil and/or groundwater are grown to facilitate such remediation, are harvested and then transplanted at a contaminated site.

It is another object of the present invention to provide a method of growing trees for use in remediating contaminated soil and/or groundwater, with root systems which will readily root in the earth at a contaminated site so that remediation is initiated more quickly and is more efficient and cost-effective.

These and other objects of the present invention can be realized by creating a hole in the earth, and preparing it to influence the elongate growth of the root system of the tree planted therein, at least partially filling the hole with a rooting medium, planting a tree in the hole, harvesting the tree and its substantially long and narrow root system resulting from the structure of the hole, transporting the tree to a contaminated site, replanting the tree with its substantial long and narrow root system such that remediation of contaminated soil and/or groundwater at the contaminated site is facilitated. This method provides for efficient remediation at the contaminated site.

As part of this embodiment, a structure can be optionally provided at the bottom of the hole such that root growth is prevented beyond such structure, resulting in a more easily harvested tree. The structure can be a basin, a cap, or an integral part of a liner which lines the walls of the hole. Such a liner is preferred but not necessary in practicing this invention, and the liner can be a hard casing or a flexible casing (or a combination of both), the flexible casing having self-sealing advantages. The liner can also be harvested with the tree and its root system such that upon transplantation of the tree, continued long and narrow root development continues. Transportation and transplanting are also facilitated by harvesting the tree with the liner. To facilitate harvesting, water can be carried at high pressure at, for instance, the bottom of the hole, whereby the root system will be loosened within the hole and removal of the substantially long and narrow root system would be facilitated.

Another aspect of the present invention can be realized by providing an elongated casing having first and second end, placing the root system of the tree partially into the first end of the casing, providing a rooting medium within the casing, whereby the root system of the tree would be encouraged to grow substantially long and narrow, harvesting the tree and its root system, transporting the tree through contaminated site, and replanting the tree with its substantially long and narrow root system to facilitate remediation of the soil and/or groundwater at the contaminated site. In this aspect of the present invention the casing may or may not be within the earth when its root system is being induced to grow substantially long and narrow and before harvesting the same for replantation at a contaminated site. The casing may be arranged substantially horizontally, substantially vertically, or at any angle. If at an angle or horizontally, upon harvesting, the root system and the base of the tree might be cut from the remaining portion of the tree which would be growing at an angle to the root system. This would facilitate transportation and replantation. The rooting medium used in this aspect of the present invention may be any suitable rooting medium, including oxygenated water, a continuous mist of water, soil or soil-like material. This method, as well as the resulting tree, are aspects of the present invention which also provide for more efficient and cost effective remediation.

Another aspect of the present invention relates to a method of growing transplantable trees, as well as the resulting trees, whereby a casing having a first end and a second end are provided, the root system of the tree are provided at least partially into the first end of the casing, and the casing is not within the earth. The rooting medium is provided within at least a portion of the casing, and the root system is encouraged to grow substantially long and narrow.

BRIEF DESCRIPTION OF THE DRAWINGS

The above and other objects and advantages of the present invention will become apparent, as will a better understanding of the concepts underlying the present invention, by reference to the description which follows and refers to the accompanying drawings in which.

DETAILED DESCRIPTION OF THE INVENTION

The present invention concerns the planting of and harvesting of vegetation for use in the remediation of contaminated soil or groundwater. (The terms "vegetation" and "trees" are used interchangeably to refer to any plant, plant species, cutting or the like which may be suitable for use in connection with the remediation of contaminated soil or groundwater. The term "soil" as used herein shall refer to any soil media including media made up of gravel, sand and/or soil and other soil-like material.)

In connection with the present invention, a hole (typically many holes) must be created in the earth in the contaminated area in order to plant the appropriate vegetation. This may be accomplished in any suitable manner, but is most often accomplished by augering (i.e., drilling) a cylindrical hole which is vertical or substantially vertical (though it can be at any angle).

Figure 1:
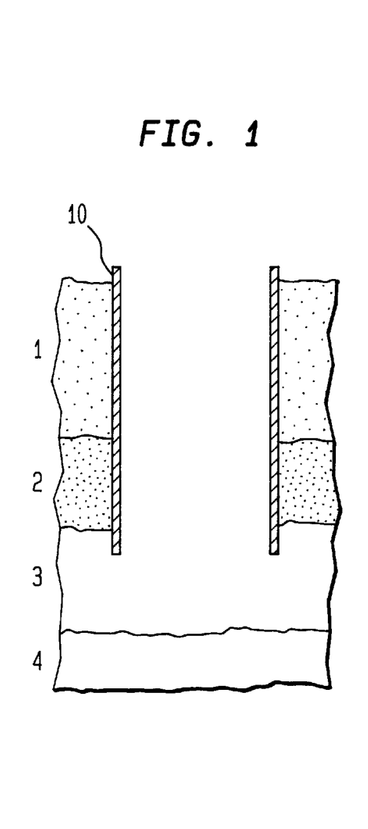
FIG. 1 is a schematic representation of a cross-section of earth in which a hole has been established and lined.

In one aspect of the present invention, as shown in FIG. 1, a hole, preferably a cylindrical hole, is drilled through the various layers of earth to reach a contaminated aquifer. By way of example, in FIG. 1, these layers include the vadose layer 1, the capillary fringe layer 2, the upper aquifer layer 3 and the lower aquifer layer 4. For purposes of this application, the vadose layer 1 is typically made up of unsaturated soil and could be as deep as about 30 feet from the surface. The capillary fringe layer is typically made up of "field capacity" soil where only micropores are saturated, the water being drawn into the micropores and held by capillary action. The capillary fringe layer may reach a depth of about 40 feet. The upper aquifer layer 3 is typically a water saturated soil, typically uncontaminated groundwater, and it may reach a depth of greater than 60 feet. The deeper aquifer layer is also typically made up of a water saturated soil, and may reach a depth of greater than 100 feet. In this example, it is the deeper aquifer layer 4 which contains the contaminated groundwater.

Figure 2:
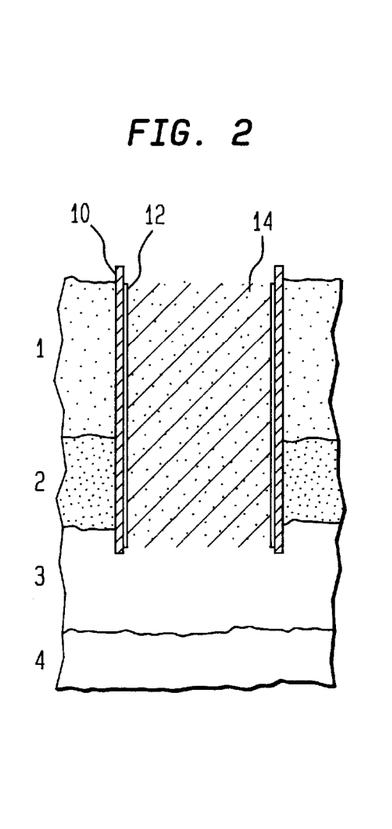
FIG. 2 is a schematic representation of a cross-section of the earth in FIG. 1, in which the lined hole has been further lined and has been filled with a rooting medium.
Figure 3:
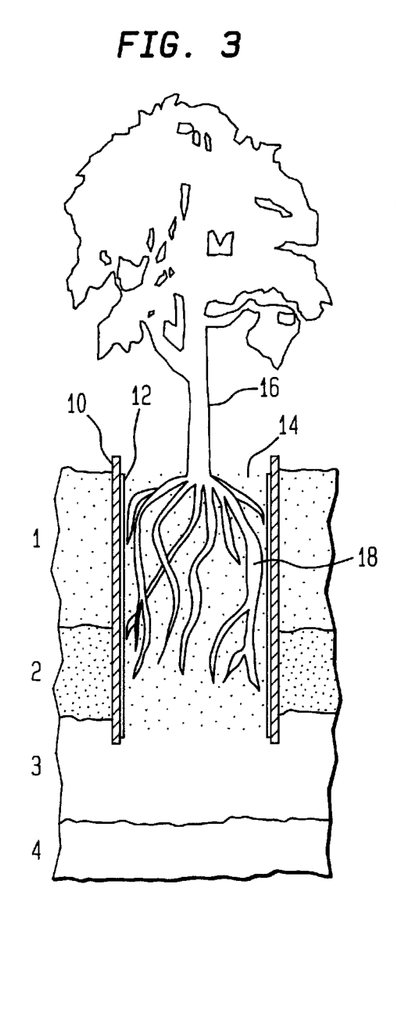
FIG. 3 is a schematic representation of the cross-section of earth in FIGS. 1 and 2, together with a tree planted in the lined and filled hole.

As can be seen in FIGS. 1–3, in the preferred embodiment, the illustrated hole reaches the upper aquifer layer 3. Because the prepared hole extends into the aquifer layer, the structure can take advantage of natural occurrences. That is, less or no irrigation is required since the water in this saturated aquifer layer will naturally feed the root system 18. Also, root growth will be limited to the area of the prepared hole. This facilitates the harvesting of the root system 18. The hole is lined with a hard casing 10, which preferably possesses a degree of rigidity by which it has some stiffness independently of any other structures. It may be of any suitable or desirable shape or size. In constructing and lining the hole, a conventional drilling technique or any other suitable technique for creating a hole can be used. Such a technique might include alternately augering the earth and pounding (or otherwise placing) the hard casing 10 into the augered hole.

Typically, the hard casing will be cylindrical in shape, and will be approximately in the range of 6" to 12" in diameter, though circumstances may require smaller or larger diameters. The lined hole can be as deep as 5–20 or more feet. The hard casing 10 may be PVC or ABS piping, any other suitable commercially available piping or made of any suitable material. The hard casing 10 maintains the structure of the augered hole during the planting process. It is recognized that the hard casing, while preferred, is optional since it is not required at all where the soil in which the hole is drilled is a tight soil such that the integrity of the hole will be maintained even without a hard casing.

In FIG. 2, the hole lined with the hard casing 10 is lined with a flexible casing 12, and the lined hole is backfilled with fill 14. The flexible casing 12 is made of any suitable material which is flexible and is at least substantially impervious to water and nutrients. A preferred self-sealing, flexible casing is a medium to heavy gauge flexible plastic tubing which is of a diameter which matches or exceeds the diameter of the hole and, if used, the hard casing 10. The plastic tubing may be 3 to 10 mils in thickness, or any other suitable thickness given the circumstances. The flexible casing 12 is discussed in more detail below with regard to FIGS. 5 & 6.

It is important to note that the hard casing 10 can be left in place and used without the flexible casing 12. But the above advantages, e.g., upon harvesting and replanting of a tree in accordance with the present invention, will not be realized.

While the flexible casing 12 can be put in place together with the hard casing 10 or after the hard casing 10 is in place, with the hard casing later being removed, other techniques can also be used to place the flexible casing 12 in the hole. One such technique is to use a hollow stem auger with a mud rotary drilling method which serves to keep the sides of the hole open when the auger is removed. To reach the desired depth, the flexible casing 12 is placed inside the hollow stem and the auger is pulled out, leaving the flexible casing 12 in place within the hole.

The fill 14 for the lined hole preferably includes a good rooting medium. However, it may be desirable to put stones or pebbles at the bottom and/or at the top of the lined hole. Stones and/or pebbles have been used before at both the top and the bottom of a hole lined with a hard casing. At the top, the stones and/or pebbles will help insulate and limit high soil temperatures at the immediate soil surface during periods of intense sunlight. The stones and/or pebbles will also limit the sealing of the surface soil material to oxygen exchange by limiting rain water compaction and/or the severe drying associated with the high soil temperatures, thereby keeping soil pores open for gas exchange. At the bottom, the stones and/or pebbles create a separation between the soil in the tube from that at the bottom of the tube which will facilitate harvesting by reducing the adhesion to the bottom of the tube of the soil matrix, and will further act to limit root development to the bottom of the tube as this zone will typically be saturated.

In FIG. 3, a tree 16 has been planted and has developed an elongate root system within the lined and filled hole. This columnar root system is particularly useful for transplantation within a remediation project so that the elongate root system provides for ready rooting activity into contaminated aquifers, which may be as deep as 50 feet below the ground surface, or ready rooting activity within contaminated soils at lower depths.

It is noted that the hard casing 10 is not required to facilitate the directed growth as discussed above. The flexible casing 12 will also facilitate such directed growth. Indeed, because of the self-sealing quality of the flexible casing 12, the roots 18 of tree 16 will grow downward more aggressively for more efficient remediation upon replanting. However, when the tree 16 is ready for harvesting for transplantation on an environmental clean up site, the use of a hard casing 10 facilitates such harvesting.

Figure 4:
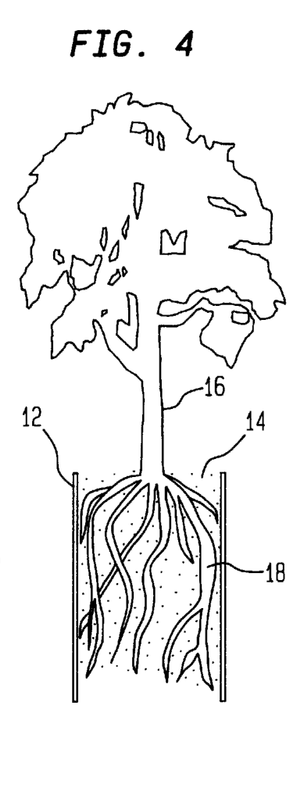
FIG. 4 is a schematic representation of a cross-section of a tree harvested with a liner.

In FIG. 4, a harvested tree 16 is illustrated. This tree 16 has the long and narrow root system made up of roots 18, which will facilitate the ready rooting of the tree 16 upon replanting, and thus an almost immediate remediation effect. The harvested tree 16 includes, optionally, the flexible casing 12 which helps maintain the roots and any remaining soil while the harvested tree 16 is transported for transplantation. Of course, as discussed above, the flexible casing 12 around the columnar root system will also facilitate the continued growth of a columnar root system since the flexible casing 12 will substantially prevent lateral growth and will create a seal to prevent migration of the surface water along the casing.

one of the advantages of growing trees as set forth above is that the hole prepared for growing the tree can be made to substantially match the size and shape of a hole which would be prepared at a remediation site. Thus, upon harvesting, the trees grown by this method can readily fit into the holes at the site. The above method thus allows for ease of planting at a remediation site. This advantage, taken with the ready rooting activity provided by the elongate root structure, is valuable in remediating contaminated soil and/or groundwater.

Another method which might be used to facilitate the harvesting of trees grown to establish the long and narrow root system is to use a casing having a substantially truncated cone shape, i.e., the walls of the casing converge towards one another from the ground surface down. A root system in such a shape will be easier to move upward upon harvest. The same is obviously true if the casing, hard or flexible, is removed with the root system and soil.

The flexibility of the material used for flexible casing 12 facilitates the self-sealing aspect of a tree harvested and used for environmental remediation in accordance with the present invention. The self-sealing quality of the flexible casing 12 inhibits the migration of water in the upper levels or surface of the ground to lower levels of soil. The result is that the root growth is more focused at the deeper levels than it would be with a hard casing, and the roots at those deeper levels will be better developed and more extensive which will improve the ability of the vegetation to absorb contaminants when they exist in the soil and/or groundwater. A pliable plastic material as discussed above seals tightly to the outside soil as the lined hole is filled with soil, gravel or other fill material. Also, it will be extremely difficult for roots to grow through.

More specifically, when a hole is dug and backfilled against a hard casing, a natural loosened vertical pathway of outer soil lies against the hard casing. Instead of near-surface and surface water being absorbed and percolated through the outer soil, it is likely to find the vertical pathway at the junction of the hard casing and outer soil, and migrate downward. Whether the casing extends into the vadose layer 1 only or extends into the lower aquifer layer 4, this vertical pathway is undesirable. When in the vadose layer 1, the lower root system will simply be fed by this migration surface water, and will be less likely to seek out water and nutrients at the deeper levels—i.e., those from the contaminated soil and groundwater.

Figure 5:
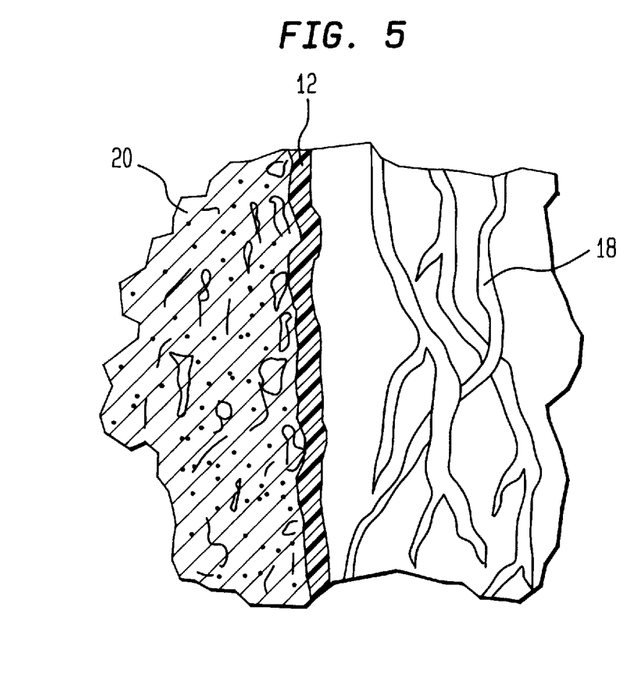
FIG. 5 is an enlarged cross-sectional view of a portion of a lined hole in which a root system is growing, illustrating the self-sealing of the flexible casing.
Figure 6:
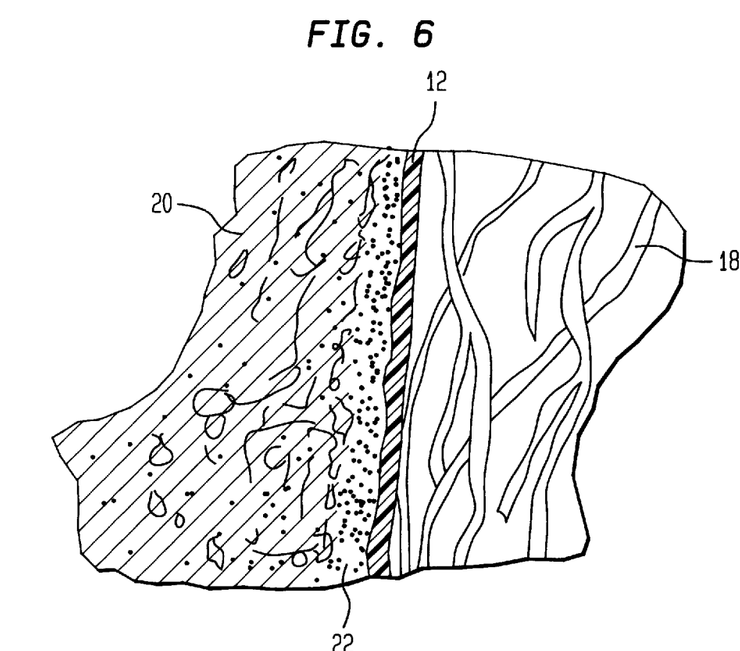
FIG. 6 is an enlarged cross-sectional view of a portion of a lined hole in which a root system is growing, illustrating the use of an additive to facilitate the seal between the flexible casing and the soil outside of the hole.

As can be seen in FIG. 5, illustrating an enlarged view of a portion of a lined hole, the flexible casing 12 is forced against the irregular surface of the hole and fills any gaps so that it is tight against the outside soil (which is generally designated as 20 in FIGS. 5 and 6). The sealing effect is created when the lined hole is back-filled such that the fill forces the flexible casing 12 against the walls of the hole. The tight seal between the outside soil 20, the flexible casing 12 and the soil inside the hole inhibits, and in some cases prohibits, the migration of surface water or water in the upper levels of earth from migrating to lower levels of earth. Any such water would thus be unavailable to the roots 18, such that the roots 18 feed primarily on the contaminated groundwater in the lower aquifer level 4. Since the lower root system will not be feeding on water migrating from above, it will thus develop to utilize only the deep water having contaminants. The result is an increase in the efficacy of the plant in extracting contaminants from the contaminated layers.

In FIG. 6, the soil 20 is somewhat more coarse than a sandy or clay composition, and thus an additive 22 has been placed around the perimeter of the hole to facilitate the sealing of the flexible casing 12 to the outside soil. Such an additive might be a clay material or similar composition such as bentonite, concrete mix, or any other suitable material. The use of such an additive will depend upon the plasticity of the soil. The less the plasticity of the outer soil, the more an additive will be helpful. The flexible casing 12 can be used to line holes which are not prepared to target contaminated groundwater in an aquifer.

Figure 7:
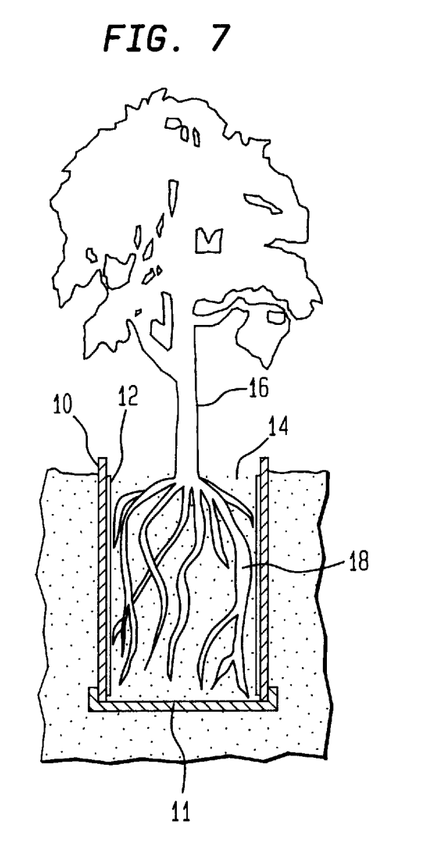
FIG. 7 illustrates another embodiment of tree planted and grown for harvesting, illustrating in particular a cap at the bottom of the structure for facilitating elongate growth of the root system.

FIG. 7 illustrates another embodiment of the present invention by which a cap 11 is provided at the bottom of the hard casing 10. The cap 11 as shown in FIG. 7 is a separate piece which connects to the hard casing 10. However, other suitable structures can also be used. For instance, the hard casing 10 and the cap 11 could be integrally formed. The purpose of the cap 11 is to control the growth of the root system 18, as well as to facilitate the harvesting of the tree 16, or more accurately the root system 18, from the prepared hole. It is discussed in more detail below. When the cap 11 is used, the root system 18 must be irrigated from the top of the hole.

Figure 8:
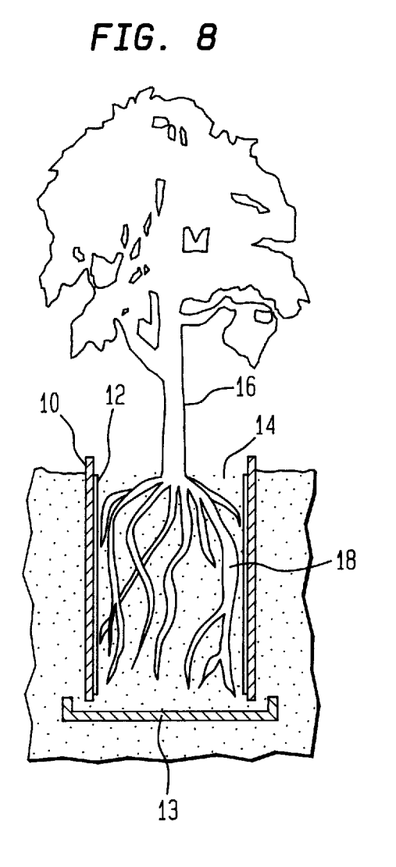
FIG. 8 illustrates another embodiment of tree planted and grown for harvesting, illustrating in particular the use of a basin in connection with the structure for facilitating elongate growth of the root system.

FIG. 8 illustrates yet another embodiment, by which a basin 13 is provided below the hard casing 10, and separated therefrom. The basin 13 will hold water to a depth of a couple of inches, and this will control the growth of the roots beyond the depth of the basin 13, and more importantly outside of the prepared hole. The controlled growth of the root system 18 will facilitate the harvesting of the same.

The cap 11 and basin 13 can be made up of any suitable material which can hold water and/or prevent roots from growing beyond the same. For instance, PVC or ABS materials are suitable.

Figure 9:
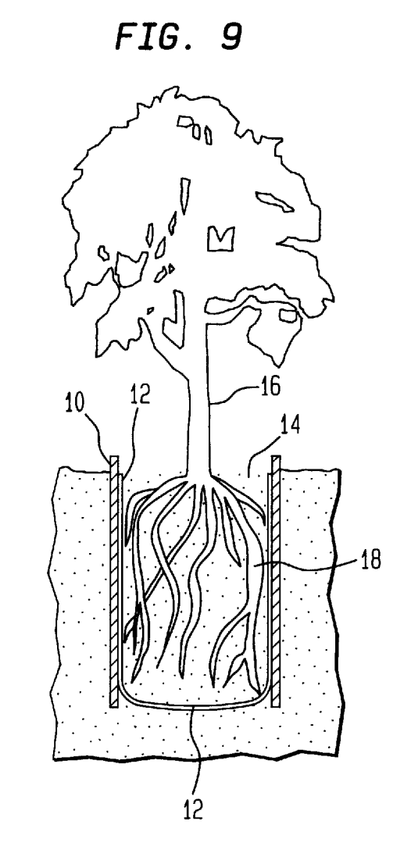
FIG. 9 illustrates another embodiment of tree planted and grown for harvesting, illustrating in particular the use of the flexible casing to form a "bag" in connection with the structure for facilitating elongate growth of the root system.

FIG. 9 reveals yet another embodiment by which the flexible casing 12 is provided not only on the walls of the prepared hole (against the hard casing 10 in this embodiment), but also at the bottom of the prepared hole. The flexible casing 12 will thus serve a similar purpose to the cap 11 and basin 13. The structure of the flexible casing 12 at the bottom of the prepared hole can be completely sealed, or can be loosely tied so that the amount of water which is allowed to seep below it will be limited. Also, upon harvesting, the "bagged" structure of the root system 18 is advantageous for transportation and transplantation.

Each of the embodiments in FIGS. 7–9 provide situations in which water will pond near the bottom of the root system 18 to control the growth of the root system 18. The water which ponds in the cap 11, basin 13 or flexible casing 12 will prevent or limit water flow out of the prepared hole. Depending upon which of these systems is used, irrigation may be necessary from the top, or it could be possible from the bottom. Structures can even be provided to extend to the bottom of the root system 18 to feed the root system 18 at least water.

There are many ways to harvest the tree 16 with its narrow and deep root system, and any will suffice. However, one possible way to more quickly and efficiently harvest the tree 16 and its elongate root system is to inject water at high pressure at the bottom of the hole. This can be accomplished using a structure built into either the hard casing 10, the cap 11 and/or the basin 13, or in any other manner. For instance, a tube or tubes carrying water at high pressure can be inserted, in an opening between the hard casing 10 and the basin 13. This can be done at the time of harvest or at the time of planting. Such tubes might be juxtaposed along the casing outside of the lined hole, extend through an opening between the hard casing 10 and the basin 13 and perhaps have nozzles directed upward into the lined and filled hole. Alternatively, tubes for carrying high pressure water might already be buried under the basins of many tree holes, and might be structurally associated with the basin, via holes in the bottom thereof. Indeed, such tube structures may be one way in which to maintain water in the cap 11 and/or basin 13 during growth. Depending upon how impacted the roots 18 become in forming the narrow and deep root system, these and other similar methods may be best to loosen the soil so that the tree 16 can be taken out of the lined and filled hole.

Figure 10:
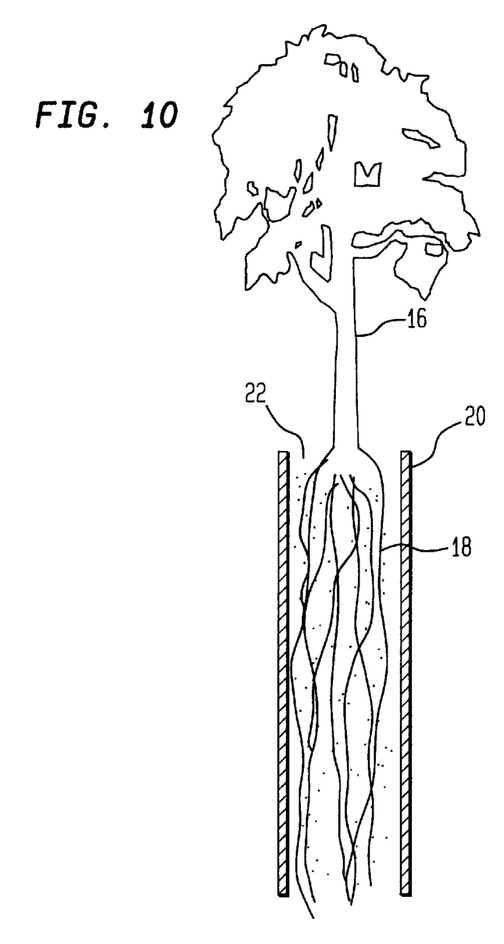
FIG. 10 is a schematic representation of an elongate root structure being grown within a column filled with a rooting medium.

In FIG. 10, another embodiment is illustrated. Here, an elongate root system made up of roots 18 is grown in a tube 20 which is not within the ground. The rooting medium 22 within the tube 20 could be any suitable rooting medium. Soil would of course be acceptable, as well as oxygenated water. While growing the elongate root system within the ground is advantageous since the ground is naturally cool, any suitable system or method for cooling the out of ground vertical tube can be implemented as well. This might involve the water used to feed the root system or mulch or another material around the tubes.

Figure 11:
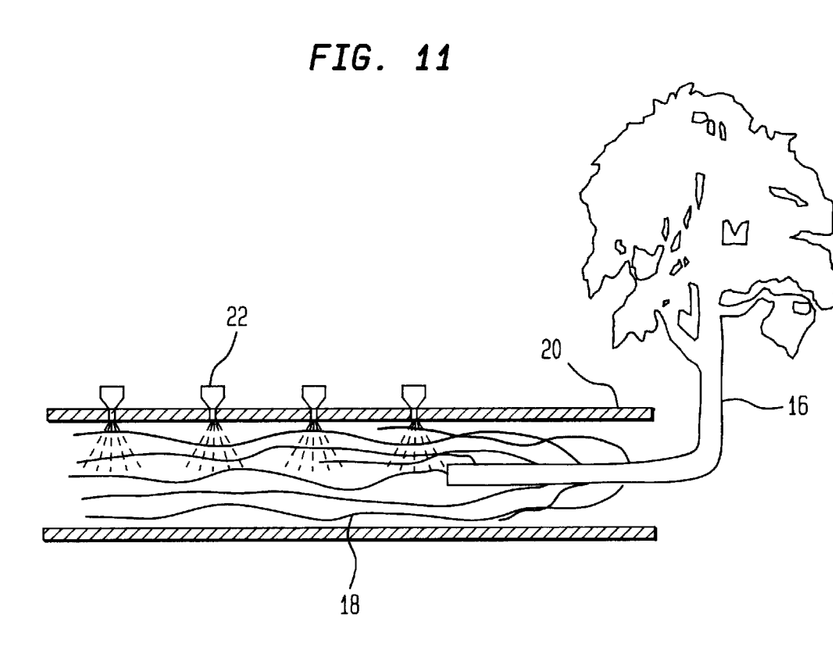
FIG. 11 is a schematic representation of an elongate root system being grown hydroponically—i.e., either by a continuous mist of water or laying in oxygenated water.

In FIG. 11, yet a further embodiment is shown. Here, a tube 20 is arranged horizontally, and thus the root system made up of roots 18 grows horizontally. (Other angles besides vertical and horizontal can be used.) The tree 16 will, however, seek to bend towards the sunlight, or artificial light, and thus grown at an angle to the root system. Upon harvesting and prior to transplantation, that portion of tree 16 which is vertical as opposed to the horizontal root system or at least a portion of it can be severed or "copped" (i.e., cut so that it will grow after it is cut). This may facilitate transportation to a remediation site, and certainly will facilitate the planting and growth of the tree at the remediation site.

Again, as with the FIG. 10 embodiment, the FIG. 11 embodiment can utilize any suitable rooting medium. Illustrated in FIG. 11 is a series of sprayers 22 for continuously misting the elongate and horizontal root system with water. And any suitable cooling system or method might also be employed.

In both the FIG. 10 and FIG. 11 embodiments, various techniques can be employed to encourage the long and narrow growth. One advantage to growing trees in this manner is that the techniques can be controlled more easily than holes dug and established in the ground. Thus, the water and nutrients available to the root system can be made more prevalent further from the trunk of the tree 16. The roots 18 will then be encouraged to grow in that direction and to grow stronger in that area. For instance, in the vertical arrangement shown in FIG. 10, the water and nutrients can be at the lower end of the tube 20, and in the embodiment shown in FIG. 11, the water can be misted towards the left end of the tube 20. These conditions can be controlled since the trees are being grown out of the ground and in columns or tubes.

As with the first embodiment, the columns or tubes can be established at such a shape and size that they will match those to be used in the field.

While the foregoing description of figures illustrates preferred embodiments of the various techniques in accordance with the present invention, it should be appreciated that the invention also covers various permutations of the foregoing described features, and that certain modifications may be made in the foregoing without departing from the spirit and scope of the present invention which is defined by the claims set forth immediately hereafter.

What is claimed is:

1. A method of growing transplantable trees with long and narrow root systems, comprising the steps of:
   (a) creating a hole in the earth;
   (b) preparing the hole to influence the downward growth of the root system of a tree planted therein by lining the walls of the hole with a material which is impervious to water and nutrients for root growth, such that the root growth of a tree is maintained within the lined hole and is directed downward;
   (c) at least partially filling the hole with a rooting medium;
   (d) planting a tree in the at least partially filled hole, whereby the root system of such tree grows within the hole, and becomes long and narrow;
   (e) harvesting the tree and its long and narrow root system;
   (f) transporting the tree with the long and narrow root system to a contaminated site having contaminated soil and/or groundwater; and
   (g) replanting the tree with the long and narrow root system to facilitate the remediation of the contaminated soil and/or groundwater at the contaminated site.

2. The method in claim 1, including the step of providing a structure at the bottom of the hole, the structure being so constructed and arranged to limit or prevent root growth beyond the structure.

3. The method in claim 1, wherein the step of lining the walls of the hole with a material includes the step of lining the walls of the hole with a hard casing made of such a material.

4. The method in claim 3, including the step of arranging a basin at the bottom of the hole and separate from the hard casing to cover the bottom of the hole.

5. The method in claim 3, including the step of arranging a cap to the bottom of the hard casing to cover the bottom of the hole.

6. The method in claim 1, wherein the step of lining the walls of the hole with a material includes the step of lining the walls of the hole with a flexible casing made of such a material.

7. The method in claim 6, wherein the steps of harvesting and replanting the tree include the steps of harvesting and replanting the tree with the flexible casing.

8. The method in claim 6, including the step of providing a bottom to the flexible casing to cover the bottom of the hole.

9. The method in claim 3, further including the step of further lining the walls of the hole with a flexible casing made of a material which is impervious to water and nutrients for root growth and is self-sealing, and the steps of harvesting and replanting the tree includes the steps of harvesting and replanting the tree with the flexible casing, whereby upon removal of the hard casing and/or upon replanting of the tree with the flexible casing, the self sealing material will seal tightly to the walls of the hole to inhibit the migration of water from the surface or near the surface to deeper levels, which might otherwise occur at the junction between the walls of the hole and the flexible casing.

10. The method in claim 9, wherein the step of harvesting the tree and its long and narrow root system includes the step of harvesting the tree and its long and narrow root system together with the flexible casing.

11. The method in claim 9, further including the step of removing the hard casing at the time the tree is planted.

12. The method in claim 11, wherein the step of harvesting the tree and its long and narrow root system includes the step of harvesting the tree and its long and narrow root system together with the flexible casing.

13. The method in claim 2, wherein the step of providing of a structure at the bottom of the hole includes the step of providing a tube for carrying water at high pressure to the bottom of the hole adjacent the structure, and wherein the step of harvesting the tree and its long and narrow root system includes the step of injecting water at high pressure into the bottom of the lined hole to loosen the root system for removal of the long and narrow root system.

14. The method in claim 2, wherein the step of lining the walls of the hole with a material includes the step of lining the walls of the hole with a flexible casing made of such a material.

15. The method in claim 14, wherein the step of harvesting the tree and its long and narrow root system includes the step of harvesting the tree and its long and narrow root system together with the flexible casing.

16. The method in claim 10, wherein the step of creating a vertically hole includes the step of drilling a hole to a diameter which is slightly undersized with respect to the diameter of holes to be made at a contaminated site having contaminated soil and/or groundwater, and wherein the step of replanting the tree includes the step of drilling a hole at the contaminated site to a diameter which is slightly larger than the diameter of the hole in which the tree has been grown.

17. A method of growing transplantable trees with long and narrow root systems, comprising the steps of:
    (a) providing an elongate casing having a first end and a second end;
    (b) placing the root system of a tree at least partially into the first end of the casing such that the remainder of the tree is outside of the casing;
    (c) providing a rooting medium within at least a portion of the casing, whereby the root system of the tree is encouraged to grow long and narrow;
    (d) harvesting the tree and its long and narrow root system from the casing;
    (e) transporting the tree to a contaminated site having contaminated soil and/or groundwater; and
    (f) planting the tree with the long and narrow root system in the earth to facilitate the remediation of the soil and/or groundwater at the contaminated site.

18. The method in claim 17, wherein the casing is arranged horizontally.

19. The method in claim 18, wherein the root system of the tree grows horizontally and at least a portion of the rest of the tree grows at an angle to the horizontal roots system, and further including the step of cutting at least a portion of the portion of tree which is growing at such an angle.

20. The method in claim 19, wherein the rooting medium is oxygenated water.

21. The method in claim 19, wherein the rooting system is a continuous mist of water.

22. The method in claim 19, wherein the rooting medium is soil.

23. The method in claim 19, including the step of controlling the amount of water and nutrients provided to the root system, including providing water and nutrients at or near the ends of the roots in order to encourage the long growth of the root system.

24. A method of growing transplantable trees with long and narrow root systems, comprising the steps of:
    (a) providing a casing having a first end and a second end;
    (b) placing the root system of a tree at least partially into the first end of the casing such that the remainder of the tree is outside of the tube and whereby the casing is not within the earth; and
    (c) providing a rooting medium within at least a portion of the casing, whereby the root system of the tree is encouraged to grow long and narrow.

* * * * *